(12) United States Patent
Han

(10) Patent No.: US 11,579,921 B2
(45) Date of Patent: Feb. 14, 2023

(54) METHOD AND SYSTEM FOR PERFORMING PARALLEL COMPUTATIONS TO GENERATE MULTIPLE OUTPUT FEATURE MAPS

(71) Applicant: ALIBABA GROUP HOLDING LIMITED, Grand Cayman (KY)

(72) Inventor: Liang Han, Campbell, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 156 days.

(21) Appl. No.: 16/526,597

(22) Filed: Jul. 30, 2019

(65) Prior Publication Data

US 2020/0073702 A1 Mar. 5, 2020

Related U.S. Application Data

(60) Provisional application No. 62/724,539, filed on Aug. 29, 2018.

(51) Int. Cl.
  *G06F 9/48* (2006.01)
  *G06F 17/15* (2006.01)
  *G06F 9/52* (2006.01)

(52) U.S. Cl.
  CPC ............ *G06F 9/4843* (2013.01); *G06F 9/522* (2013.01); *G06F 17/15* (2013.01)

(58) Field of Classification Search
  CPC ........ G06F 9/4843; G06F 17/15; G06F 9/522; G06F 9/5066; G06F 2209/483; G06N 3/063; G06N 3/08; G06N 3/0454
  See application file for complete search history.

(56) References Cited

U.S. PATENT DOCUMENTS 10,346,093 B1 *  7/2019  Wu ...................... G06N 3/0472
2004/0117790 A1 *  6/2004  Rhine .................. G06F 9/5038
                                                                            718/100

(Continued)

FOREIGN PATENT DOCUMENTS

CN           101908034 A  * 12/2010
WO     WO 2020/046643 A1    3/2020

OTHER PUBLICATIONS

Xu et al. CN 101908034 A Description Translation, Dec. 8, 2010, [database online], [retrieved on Mar. 22, 2020] Retrieved from Espacenet using Internet <URL:https://worldwide.espacenet.com/publicationDetails/biblio?II=0&ND=3&adjacent=true&locale=en_EP&FT=D&date=201012088CC=CN&NR=101908034A&KC=A>, pp. 1-40 (Year: 2010).*

(Continued)

*Primary Examiner* — Meng Ai T An
*Assistant Examiner* — Hsing Chun Lin
(74) *Attorney, Agent, or Firm* — Finnegan, Henderson, Farabow, Garrett & Dunner, LLP

(57) ABSTRACT

Systems and methods for performing parallel computation are disclosed. The system can include: a task manager; and a plurality of cores coupled with the task manager and configured to respectively perform a set of parallel computation tasks based on instructions from the task manager, wherein each of the plurality of cores further comprises: a processing unit configured to generate a first output feature map corresponding to a first computation task among the set of parallel computation tasks; an interface configured to receive one or more instructions from the task manager to collect external output feature maps corresponding to the set of parallel computation tasks from other cores of the plurality of cores; a reduction unit configured to generate a (Continued)

Parallel Computation

Collection & Reduction by 132

Parallel Computation | Collection & Reduction reduced feature map based on the first output feature map and received external output feature maps.

20 Claims, 9 Drawing Sheets

(56) References Cited

U.S. PATENT DOCUMENTS

| | | |
|---|---|---|
| 2015/0046678 A1 | 2/2015 | Moloney et al. |
| 2018/0032846 A1 | 2/2018 | Yang et al. |
| 2018/0150740 A1 | 5/2018 | Wang et al. |
| 2018/0197084 A1* | 7/2018 | Kim ..................... G06N 3/0454 |
| 2018/0238943 A1 | 8/2018 | Bernsee et al. |
| 2018/0253636 A1* | 9/2018 | Lee ........................ G06N 3/063 |
| 2019/0130575 A1* | 5/2019 | Chen ........................ G06N 3/08 |
| 2019/0188295 A1* | 6/2019 | Sirotkovic ............ G06N 3/0445 |
| 2019/0303295 A1* | 10/2019 | Steinmacher-Burow .................... G06F 12/084 |

OTHER PUBLICATIONS

Shin et al., DNPU: An 8.1TOPS/W Reconfigurable CNN-RNN Processor for General-Purpose Deep Neural Networks, Feb. 7, 2017, IEEE ISSCC, pp. 240-242 (Year: 2017).*

European Patent Office Communication issued for Application No. 19854154.2 which encloses the extended European Search Report which includes pursuant to Rule 62 EPC, the Supplementary European Search Report (Art. 153(7) EPC) and the European search opinion, dated Sep. 24, 2021, 41 pages.

Chen et al., "Eyeriss: An Energy-Efficient Reconfigurable Accelerator for Deep Convolutional Neural Networks," IEEE Journal of Solid-State Circuits, vol. 52, No. 1, Jan. 2017, pp. 127-138.

Tu et al., "Deep Convolutional Neural Network Architecture with Reconfigurable Computation Patterns," IEEE Transactions on Very Large Scale Integration (VLSI) Systems, vol. 25, No. 8, Aug. 2017, pp. 2220-2233.

International search report and written opinion in International Application No. PCT/US2019/047246, dated Nov. 7, 2019 (6 pages).

* cited by examiner for ($K_L$)

$R_L[K_L]$=compute($R_{L-1}[]$, $K_L$);

for($K_{L+1}$)

$R_{L+1}[K_{L+1}]$=compute($R_L[]$, $K_{L+1}$);

```
for (i in K) {
    parallel_for(n) {
        R[i][n]=compute(n)     402
        signal (i, 1);
    }
    wait (i, n);
    collect(R[i][n]);          404
    R[i]=reduce(R[i][n]);
}
```

METHOD AND SYSTEM FOR PERFORMING PARALLEL COMPUTATIONS TO GENERATE MULTIPLE OUTPUT FEATURE MAPS

CROSS REFERENCE TO RELATED APPLICATION

The disclosure claims the benefits of priority to U.S. Provisional Application No. 62/724,539, filed Aug. 29, 2018, which is incorporated herein by reference in its entirety.

BACKGROUND

Convolutional neural network (CNN) is one type of neural network widely applied on machine learning. CNNs are used in variety of applications including image processing, speech recognition, game play, robotics, etc. The design of an efficient architecture for CNN operations and mapping the CNN operations into the architecture can be very important.

SUMMARY OF THE DISCLOSURE

Embodiments of the disclosure provide a system for performing parallel computation. The system can include: a task manager; and a plurality of cores coupled with the task manager and configured to respectively perform a set of parallel computation tasks based on instructions from the task manager, wherein each of the plurality of cores further comprises: a processing unit configured to generate a first output feature map corresponding to a first computation task among the set of parallel computation tasks; an interface configured to receive one or more instructions from the task manager to collect external output feature maps corresponding to the set of parallel computation tasks from other cores of the plurality of cores; a reduction unit configured to generate a reduced feature map based on the first output feature map and received external output feature maps.

Embodiments of the disclosure also provide a method for performing a set of parallel computation tasks at a core of a plurality of cores coupled with a task manager. The method can include: generating, by a processing unit of the core, a first output feature map corresponding to a first computation task among the set of parallel computation tasks; receiving, by an interface of the core, one or more instructions from the task manager to collect external output feature maps corresponding to the set of parallel computation tasks from other cores of the plurality of cores; generating, by a reduction unit of the core, a reduced feature map based on the first output feature map and received external output feature maps.

Embodiments of the disclosure further provide a method for managing tasks by a task manager coupled with a plurality of cores. The method can include: instructing a core of the plurality of cores to generate a first output feature map corresponding to a first computation task among a set of parallel computation tasks, wherein the core issues a barrier instruction to the task manager and stalls generation of a second output feature map corresponding to a second computation task, after the first output feature map is generated; receiving the barrier instructions from other cores of the plurality of cores; after the barrier instructions are received, sending a resume instruction to the core to resume the generation of the second output feature map; selecting the core as a reduction core to receive from other cores external output feature maps corresponding to the set of parallel computation tasks to generate a reduced feature map based on the first output feature map and the external output feature maps, wherein the generation of the second output feature map occurs in parallel with the generation of the reduced feature map.

Additional features and advantages of the disclosed embodiments will be set forth in part in the following description, and in part will be apparent from the description, or may be learned by practice of the embodiments. The features and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed.

BRIEF DESCRIPTION OF THE DRAWINGS

Embodiments and various aspects of the present disclosure are illustrated in the following detailed description and the accompanying figures. Various features shown in the figures are not drawn to scale.

FIG. 1C illustrates an exemplary program for training a convolutional neural network.

FIG. 4 illustrates an exemplary program for performing parallel computation, according to embodiments of the disclosure.

DETAILED DESCRIPTION

Particular aspects of the present disclosure are described in greater detail below. The terms and definitions provided herein control, if in conflict with terms and/or definitions incorporated by reference.

The techniques described in this disclosure have one or more of the following technical effects. In some implementations, the techniques described in this disclosure provide a system for performing parallel computation, including a task manager; and a plurality of cores coupled with the task manager and configured to respectively perform a set of parallel computation tasks based on instructions from the task manager, wherein each of the plurality of cores further comprises: a processing unit configured to generate a first output feature map corresponding to a first computation task among the set of parallel computation tasks; an interface configured to receive one or more instructions from the task manager to collect external output feature maps corresponding to the set of parallel computation tasks from other cores of the plurality of cores; a reduction unit configured to generate a reduced feature map based on the first output feature map and received external output feature maps. This task manager allows the processing unit to process a matrix for a current iteration and other components (e.g., the interface, the memory unit, and the reduction unit) to generate a reduced feature map based on results of a previous iteration in parallel. Thus, the parallelism of e.g., the CNN operations can be further explored.

As used herein, the terms "comprises," "comprising," or any other variation thereof are intended to cover a non-exclusive inclusion, such that a process, method, composition, article, or apparatus that comprises a list of elements does not include only those elements but may include other elements not expressly listed or inherent to such process, method, composition, article, or apparatus. The term "exemplary" is used in the sense of "example" rather than "ideal."

Figure 1A:
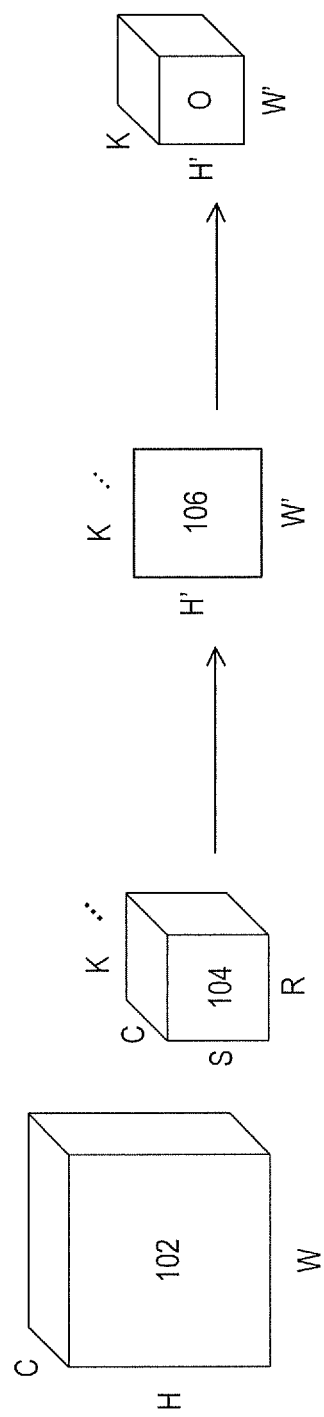
FIG. 1A illustrates an exemplary convolutional neural network (CNN) operation.

FIG. 1A illustrates an exemplary convolutional neural network (CNN) operation. In this exemplary operation, input activations of a layer are structured as a set of two-dimensional (2D) input feature maps across a number (e.g., C) of channels. Each of the two-dimensional input feature map can be referred to as a channel. As shown in FIG. 1A, an input data 102 (e.g., an image) of one channel has a size of H×W. Therefore, the size of the set of two-dimensional (2D) input feature maps can be H×W×C.

Each channel can be convolved with a 2D filter with a size S×R from a stack of filters 104. One filter 104 can be used for one channel, correspondingly. Filter 104 can slide on the input feature maps, and a point can be generated from a convolutional operation of filter 104 (including weights) and a portion of the input feature map covered by filter 104. By sliding filter 104 on the feature map and repeating the convolutional operation, an H'×W' sized feature output map 106 can be generated. As shown in FIG. 1A, there exists K groups of filter 104, thereby resulting in K dimensions of H'×W' sized feature output map 106. In other words, a size of feature output map 106 is H'×W'×K.

In a CNN model, such operations can repeat for a plurality of layers. During these operations, feature output map 106 of a previous layer serves as an input data of a next layer. In other words, a feature output map 106 sized H'×W'×K in a previous layer can serve as an input data 102 in a next layer. It is appreciated that size values (e.g., H', W', and K) of feature output map 106 in the previous layer can be used as size values (e.g., H, W, and C) of input data 102 in the next layer.

Figure 1B:
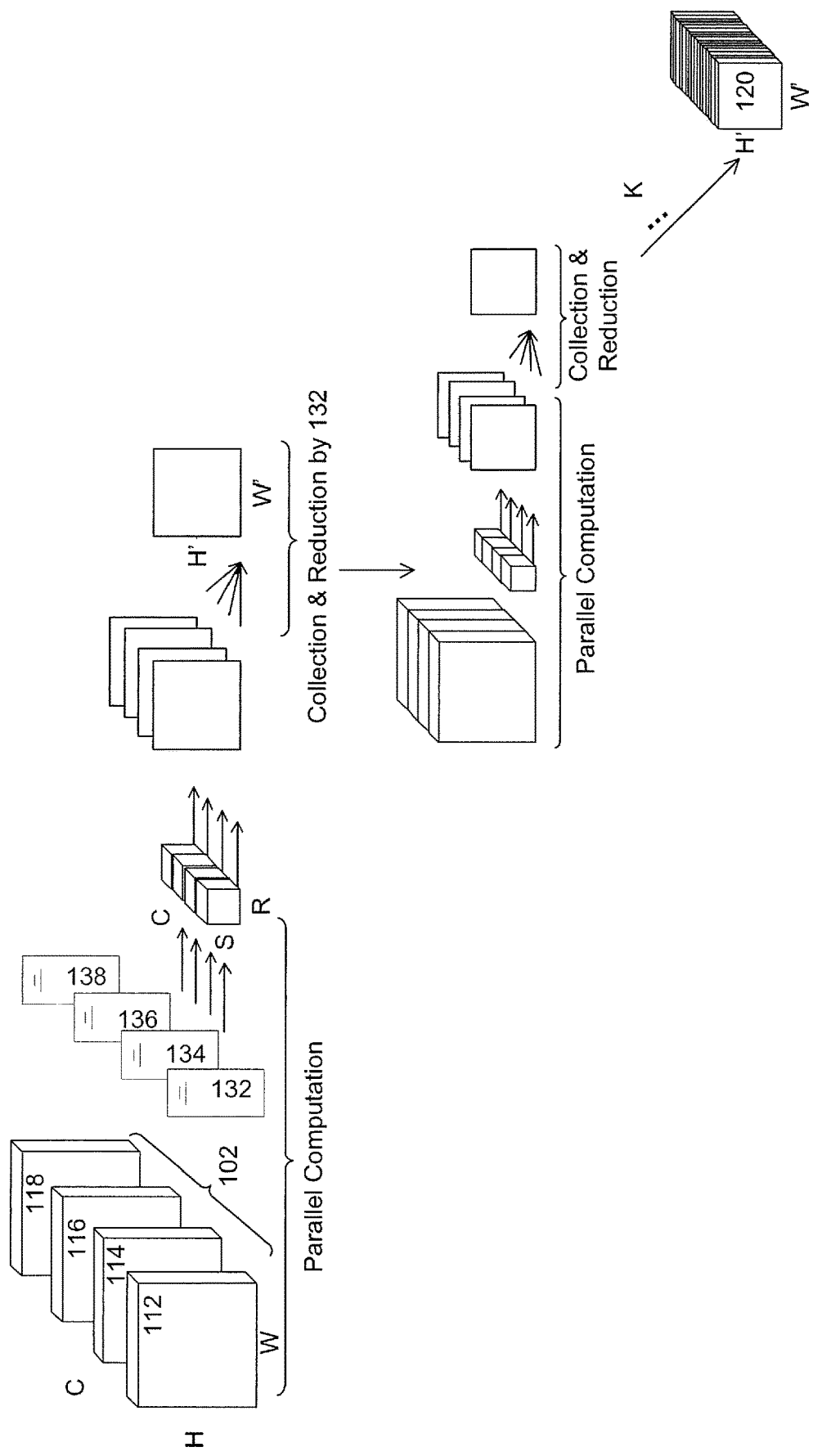
FIG. 1B illustrates a division of the CNN operations.

Due to the parallelism nature of a CNN training, CNN operations of the CNN training can be distributed among a plurality of processing cores in K dimensions. FIG. 1B illustrates a division of the CNN operations. In some embodiments, the CNN operations can be divided and distributed among several processing cores. For example, as shown in FIG. 1B, input data 102 sized H×W×C can be divided into, for example, four portions 112, 114, 116, and 118, and distributed to four processing cores (e.g., cores 132, 134, 136, and 138). Therefore, each processing core is responsible for ¼ of input data 102. A filter sized S×R×C is also distributed across four processing cores 132, 134, 136, and 138. Therefore, in a phase of parallel computation of FIG. 1B, each of four processing cores 132, 134, 136, and 138 can generate an intermediate feature map in parallel. After four processing cores 132, 134, 136, and 138 generate the intermediate feature maps, a first core (e.g., core 132) of four processing cores 132, 134, 136, and 138 can collect the generated intermediate feature maps and reduces them to a single feature map in a phase of collection and reduction. It is appreciated that the single feature map generated in the phase of collection and reduction is an output of a first group of K groups of filter 104 in a first layer.

FIG. 1C illustrates an exemplary program 130 for training a convolutional neural network. Program 130 shows a connection between an output of a first layer L and an input of a second layer L+1. For example, in exemplary program 130, in an iteration of the first layer L, an output $R_L$ can be generated and used as an input for an iteration of the second layer L+1.

As discussed above, the output of a previous layer can be an input of a next layer. Therefore, the above two phases can be repeated for K times. During the iterations, the collection and the reduction are rotated among all cores. For example, the second core performs the second round of collection and reduction, the third core and fourth core perform the third and fourth rounds, respectively, and back again to the first core for the fifth round. Referring back to FIG. 1B, the iterations can result in an output 120 including K feature maps distributed on the 4 cores in an interleaved way.

Embodiments of the present disclosure provide systems and methods for parallel computation, e.g., CNN operations. The disclosed embodiments distribute the computation and the reduction to different components of a core, allowing the computation and the reduction to be performed in parallel. For example, the phase of computation can use arithmetic and logic units (ALUs) while the phase of collection and reduction can use a memory, an interface, and a reduction unit. Thus, the iterations can be pipelined to enhance performance.

Figure 2A:
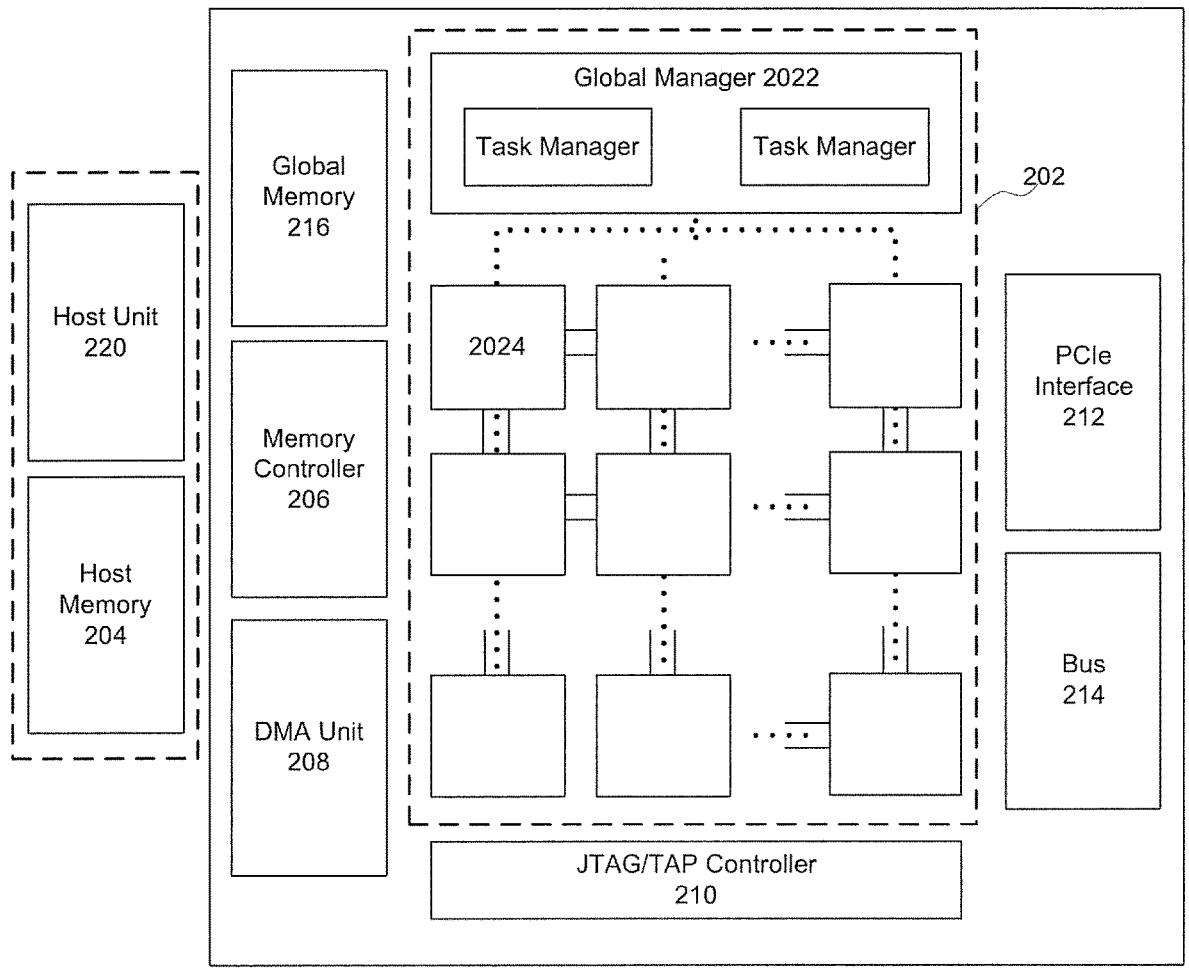
FIG. 2A illustrates an exemplary neural network processing architecture, according to embodiments of the disclosure.

FIG. 2A illustrates an exemplary parallel computing architecture 200, according to embodiments of the disclosure. As shown in FIG. 2A, architecture 200 can include a chip communication system 202, a host memory 204, a memory controller 206, a direct memory access (DMA) unit 208, a Joint Test Action Group (JTAG)/Test Access End (TAP) controller 210, a peripheral interface 212, a bus 214, a global memory 216, and the like. It is appreciated that, chip communication system 202 can perform algorithmic operations (e.g., machine learning operations) based on communicated data.

Chip communication system 202 can include a global manager 2022 and a plurality of cores 2024. Global manager 2022 can include at least one task manager to coordinate with one or more cores 2024. Each task manager can be associated with an array of cores 2024 that provide synapse/neuron circuitry for parallel computation (e.g., the neural network). For example, the top layer of processing elements of FIG. 2A may provide circuitry representing an input layer to a neural network, while the second layer of cores may provide circuitry representing a hidden layer of the neural network. In some embodiments, chip communication system 202 can be implemented as a neural network processing unit (NPU), a graphic processing unit (GPU), or another heterogeneous accelerator unit. As shown in FIG. 2A, global manager 2022 can include two task managers to coordinate with two arrays of cores.

Cores 2024, for example, can include one or more processing elements that each include single instruction, multiple data (SIMD) architecture including one or more processing units configured to perform one or more operations (e.g., multiplication, addition, multiply-accumulate, etc.) based on instructions received from global manager 2022. To perform the operation on the communicated data packets, cores 2024 can include one or more processing elements for processing information in the data packets. Each processing element may comprise any number of processing units. In some embodiments, core 2024 can be considered a tile or the like.

Host memory 204 can be off-chip memory such as a host CPU's memory. For example, host memory 204 can be a DDR memory (e.g., DDR SDRAM) or the like. Host memory 204 can be configured to store a large amount of data with slower access speed, compared to the on-chip memory integrated within one or more processors, acting as a higher-level cache.

Memory controller 206 can manage the reading and writing of data to and from a specific memory block within global memory 216 having on-chip memory blocks (e.g., 4 blocks of 8 GB second generation of high bandwidth memory (HBM2)) to serve as main memory. For example, memory controller 206 can manage read/write data coming from outside chip communication system 202 (e.g., from DMA unit 208 or a DMA unit corresponding with another NPU) or from inside chip communication system 202 (e.g., from a local memory in core 2024 via a 2D mesh controlled by a task manager of global manager 2022). Moreover, while one memory controller is shown in FIG. 2A, it is appreciated that more than one memory controller can be provided in architecture 200. For example, there can be one memory controller for each memory block (e.g., HBM2) within global memory 216.

Memory controller 206 can generate memory addresses and initiate memory read or write cycles. Memory controller 206 can contain several hardware registers that can be written and read by the one or more processors. The registers can include a memory address register, a byte-count register, one or more control registers, and other types of registers. These registers can specify some combination of the source, the destination, the direction of the transfer (reading from the input/output (I/O) device or writing to the I/O device), the size of the transfer unit, the number of bytes to transfer in one burst, and/or other typical features of memory controllers.

DMA unit 208 can assist with transferring data between host memory 204 and global memory 216. In addition, DMA unit 208 can assist with transferring data between multiple NPUs (e.g., NPU 202). DMA unit 208 can allow off-chip devices to access both on-chip and off-chip memory without causing a CPU interrupt. Thus, DMA unit 208 can also generate memory addresses and initiate memory read or write cycles. DMA unit 208 also can contain several hardware registers that can be written and readby the one or more processors, including a memory address register, a byte-count register, one or more control registers, and other types of registers. These registers can specify some combination of the source, the destination, the direction of the transfer (reading from the input/output (I/O) device or writing to the I/O device), the size of the transfer unit, and/or the number of bytes to transfer in one burst. It is appreciated that architecture 200 can include a second DMA unit, which can be used to transfer data between other neural network processing architectures to allow multiple neural network processing architectures to communication directly without involving the host CPU.

JTAG/TAP controller 210 can specify a dedicated debug port implementing a serial communications interface (e.g., a JTAG interface) for low-overhead access to the NPU without requiring direct external access to the system address and data buses. JTAG/TAP controller 210 can also have on-chip test access interface (e.g., a TAP interface) that implements a protocol to access a set of test registers that present chip logic levels and device capabilities of various parts.

Peripheral interface 212 (such as a PCIe interface), if present, serves as an (and typically the) inter-chip bus, providing communication between architecture 200 and other devices.

Bus 214 includes both intra-chip bus and inter-chip buses. The intra-chip bus connects all internal components to one another as called for by the system architecture. While not all components are connected to every other component, all components do have some connection to other components they need to communicate with. The inter-chip bus connects the NPU with other devices, such as the off-chip memory or peripherals. Typically, if there is a peripheral interface 212 (e.g., the inter-chip bus), bus 214 is solely concerned with intra-chip buses, though in some implementations it could still be concerned with specialized inter-bus communications.

Chip communication system 202 can be configured to perform operations based on neural networks.

Architecture 200 can also include a host unit 220. Host unit 220 can be one or more processing unit (e.g., an X86 central processing unit). In some embodiments, a host system having host unit 220 and host memory 204 can comprise a compiler (not shown). The compiler is a program or computer software that transforms computer codes written in one programming language into NPU instructions to create an executable program. In machine learning applications, a compiler can perform a variety of operations, for example, pre-processing, lexical analysis, parsing, semantic analysis, conversion of input programs to an intermediate representation, code optimization, and code generation, or combinations thereof.

In some embodiments, the compiler that generates the NPU instructions can be on the host system, which pushes commands to chip communication system 202. Based on these commands, each task manager can assign any number of tasks to one or more cores (e.g., core 2024). Some of the commands can instruct DMA unit 208 to load the instructions (generated by the compiler) and data from host memory 204 into global memory 216. The loaded instructions can then be distributed to each core assigned with the corresponding task, and the one or more cores can process these instructions.

Figure 2B:
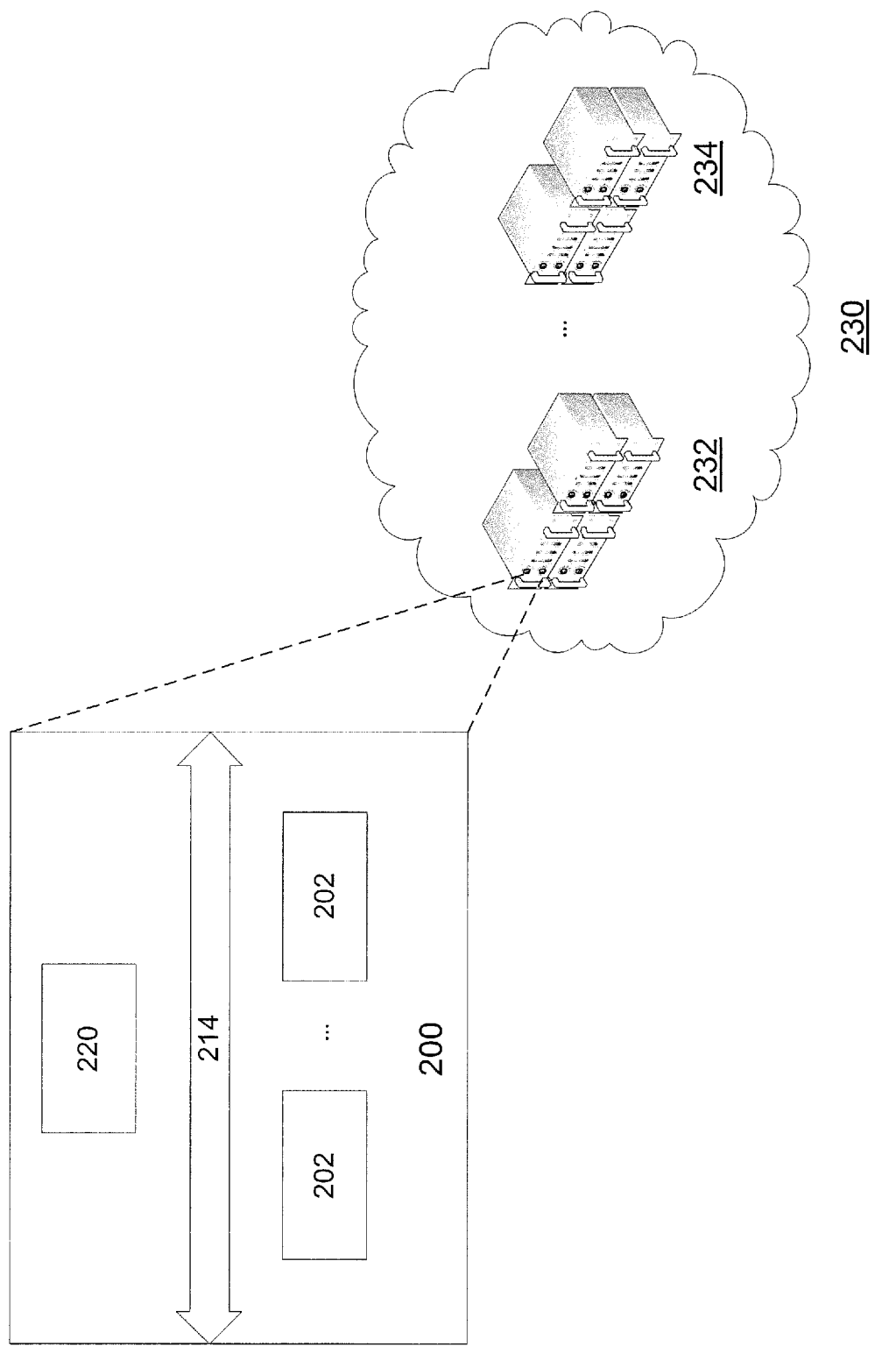
FIG. 2B illustrates a schematic diagram of an exemplary cloud system incorporating a neural network processing architecture, according to embodiments of the disclosure.

FIG. 2B illustrates a schematic diagram of an exemplary cloud system 230 incorporating neural network processing architecture 200, according to embodiments of the disclosure.

As shown in FIG. 2B, cloud system 230 can provide cloud service with artificial intelligence (AI) capabilities, and can include a plurality of computing servers (e.g., 232 and 234). In some embodiments, a computing server 232 can, for example, incorporate parallel computing architecture 200 of FIG. 2A. Parallel computing architecture 200 is shown in FIG. 2B in a simplified manner for simplicity and clarity.

With the assistance of parallel computing architecture 200, cloud system 700 can provide the extended AI capabilities of image recognition, facial recognition, translations, 3D modeling, and the like.

It is appreciated that, parallel computing architecture 200 can be deployed to computing devices in other forms. For example, neural network processing architecture 200 can also be integrated in a computing device, such as a smart phone, a tablet, and a wearable device.

Moreover, while a parallel computing architecture is shown in FIGS. 2A-2B, it is appreciated that any accelerator that provides the ability to perform parallel computation can be used.

Figure 3:
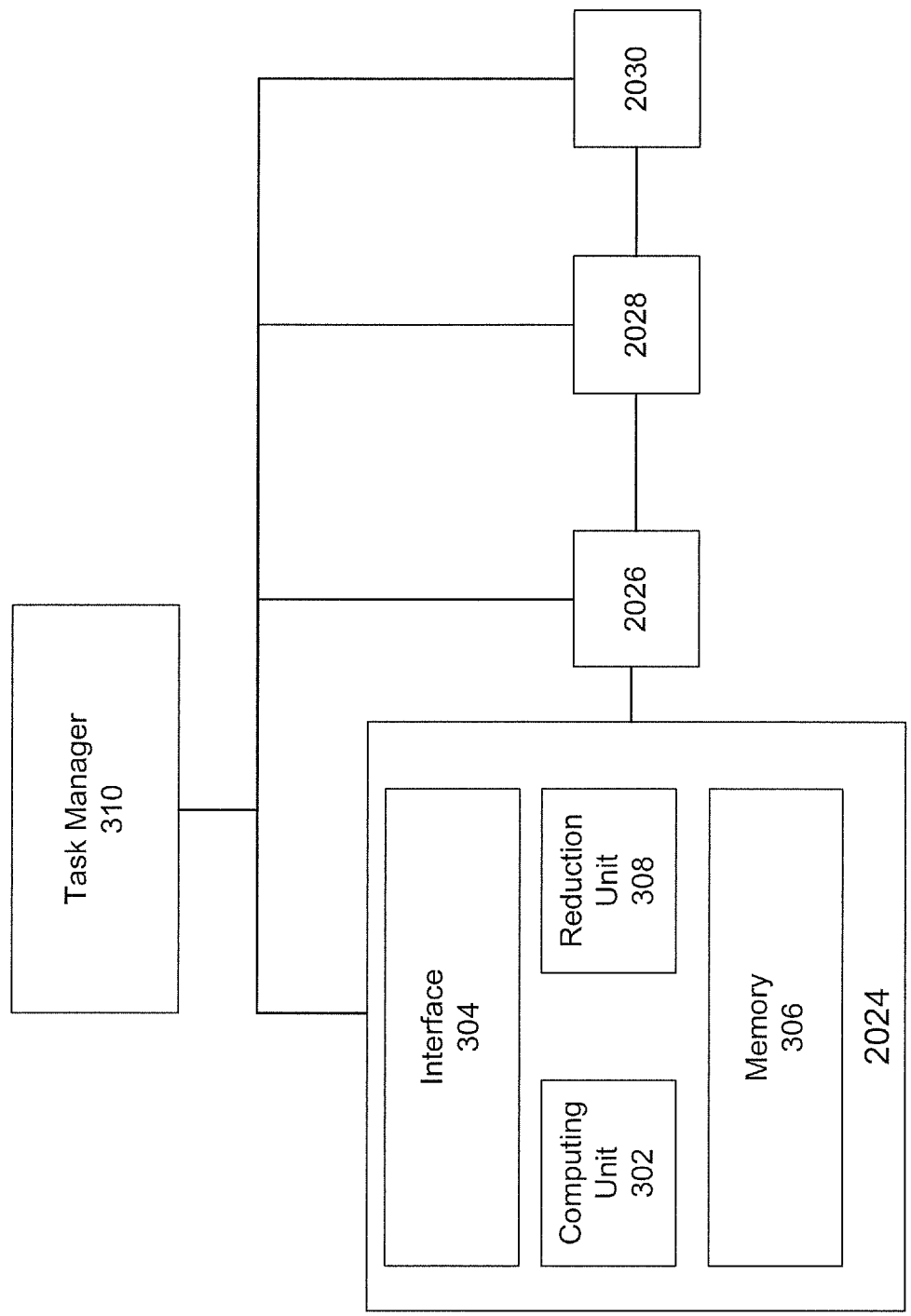
FIG. 3 illustrates a structural diagram of a system for performing parallel computation, according to embodiments of the disclosure.

FIG. 3 illustrates a structural diagram of a system 300 for performing parallel computation, according to embodiments of the disclosure. System 300 can be a sub-system of architecture 200 of FIG. 2A, and include a plurality of cores (e.g., cores 2024, 2026, 2028, and 2030), and a task manager 310 coupled with the plurality of cores. The plurality of cores can be configured to perform a set of parallel computation tasks on a set of matrices as input data, respectively, according to instructions from task manager 310.

In some embodiments, core 2024 can include a computing unit 302, an interface 304, a memory unit 306, and a reduction unit 308. It is appreciated that cores 2026, 2028, 2030, or the like can include a similar or same structure of core 2024, and description thereof is omitted herein.

Computing unit 302 can include one or more ALUs (acting as, for example, multipliers, adders, or multiply-accumulators) that are configured to perform one or more computation tasks (e.g., convolution computation) on a portion of the matrices (e.g., a first matrix or a second matrix of the set of matrices). For example, computing unit 302 can process the first matrix to generate a first output feature map corresponding to a first computation task among the set of parallel computation tasks. It is appreciated that, in some embodiments, a matrix (e.g., the first matrix) can include only one row of data. A result of the convolution computation generated by computing unit 302 of core 2024 can be stored locally or retrieved by another core (e.g., core 2026, 2028, or 2030). The locally-stored result can be referred to as a local result. For example, the first output feature map can be stored locally.

Interface 304 can be configured to communicate data with task manager 230 and other cores in a same group. In some embodiments, interface 304 can be configured to receive one or more instructions from task manager 310 to collect external output feature maps corresponding to the set of parallel computation tasks from other cores among the plurality of cores.

Interface 304 can be controlled by a task manager (e.g., task manager 310). For example, task manager 310 can provide instructions to interface 304 to enable core 2024 to perform the convolution computation. Interface 304 can also communicate with other cores (e.g., cores 2026, 2028, and 2030) to receive results of the convolution computation assigned to these cores. The results received from other cores can be referred to as external output feature maps. After the external output feature maps are collected, core 2024 can further perform a reduction on the collected external output feature maps and the local result (e.g., the first output feature map).

Other than actively acquiring the external output feature maps from other cores, interface 304 can be passive and allow task manager 310 to instruct the other cores to send the external output feature maps to core 2024, which is responsible for performing the collection and the reduction.

Local memory unit 306 can be configured to store the local result and the retrieved external output feature maps. Local memory unit 306 can include a plurality of memory blocks, using a unified addressing space. In some embodiments, higher bits of the unified addressing space can be associated with an identification of a core (e.g., a core ID). Moreover, the memory of each core can perform the collection and the reduction independently from computing unit 302. And local memory unit 306 can have dedicated ports for the collection and the reduction. For example, local memory unit 306 can include a first port for transceiving data (e.g., a local result or an external output feature map) with another core and a second port for cooperating with computing unit 302 on the reduction. Therefore, the collection and the reduction can be performed in parallel with the convolution computation performed at each core.

Reduction unit 308 can be configured to generate a reduced feature map (e.g., having dimensions of H'×W') based on the first output feature map and the received external output feature maps. For example, the first output feature map and the received external output feature maps can be reduced into the reduced feature map by pooling. The pooling can reduce the first output feature map and the received external output feature maps by computing a maximum or average value of a region of a feature map.

Task manager 310 can coordinate the plurality of cores (e.g., cores 2024, 2026, 2028, and 2030). For example, task manager 310 can include a DMA engine (not shown in FIG. 3) configured to instruct the plurality of cores to perform parallel computation, including convolution computation, collection, and reduction. In some embodiments, task manager 310 can be configured to instruct computing unit 302 of the core to generate a second output feature map corresponding to a second computation task and instruct reduction unit 308 of the core to generate the reduced feature map, simultaneously.

Because the reduced feature map is generated based on output feature maps (including the first output feature map and the external output feature maps generated by other cores), the core waits until all external output feature maps are generated. Therefore, if a new output feature map is generated before an earlier output feature map is received for the reduction, the earlier output feature map can be replaced by the new output feature. Therefore, when the first output feature map is generated, computing unit 302 can issue a barrier instruction to task manager 310 and stall the generation of the second output feature map. In this way, the output feature maps can be reserved in local memory unit 306 until the output feature maps are used for the reduction.

Task manager 310 can then receive the barrier instructions from each of the plurality of cores. After the barrier instructions are received from each of the plurality of cores, it indicates to task manager 310 that feature maps (including the first output feature maps and the external output feature maps) are ready for the reduction. The core that is selected by task manager 310 for reducing the first output feature maps and the external output feature maps can then receive the external output feature maps from other cores and reduce the feature maps. On the other hand, each of the plurality of cores can continue to generate a new set of feature maps (e.g., the second output feature map). Therefore, after the barrier instructions are received from each of the plurality of cores, task manager 310 can send a resume instruction to the core to resume the generation of the second output feature map.

FIG. 4 illustrates an exemplary program 400 for performing parallel computation, according to embodiments of the disclosure.

Comparing to program 130 of FIG. 1C, program 400 divides an iteration of K times into a low-level program 402 and a high-level program 404. As discussed above, a convolution computation task can be performed by processing units, and the collection and the reduction can be performed by a memory, an interface, and a reduction unit. Therefore, the convolution computation and the collection and reduction can be performed in parallel. By modifying program 130 into a form of program 400, the parallelism between the convolutional computation and the collection and reduction can be explored.

Low-level program 402 can be executed on each of the n cores (e.g., four cores shown in FIG. 3) in parallel. In each loop of low-level program 402, a $n^{th}$ core can perform its corresponding convolution computation by calling a function of "compute(n)." After the execution of function of "compute(n)" is finished, the $n^{th}$ core can issue, e.g., a barrier instruction, to the task manager. For example, referring to FIG. 3, computing unit 302 of core 2024 can execute a function of "signal (i,1)" to issue the barrier instruction to a DMA engine of task manager 310, when the processing of the first matrix is finished. In response to the barrier instruction, task manager 310 is aware of the finished convolution computation on the $n^{th}$ core. It is appreciated that task manager 310 can receive barrier instructions from all cores (e.g., including cores 2024, 2026, 2028, and 2030) that are in association with task manager 310. For example, task manager 310 can determine whether the barrier instructions from all cores have been received. When the barrier instructions from all cores have been received, task manager 310 can determine that convolution computation for a first iteration is finished.

In response to the received barrier instruction, task manager 310 can instruct the $n^{th}$ core to stall the convolution computation. For example, task manager 310 can send to the $n^{th}$ core a "wait" instruction to cause the $n^{th}$ core to execute a function of wait (i,n), so that the convolution computation can be stalled. While the convolution computation is stalled on the $n^{th}$ core, the $n^{th}$ core may still wait for further instructions from task manager 310.

It is appreciated that results (e.g., intermediate feature maps) of the convolution computation can be stored in a local memory (e.g., local memory unit 306) of each core.

In some embodiments, after barrier instructions from all cores have been received, high level program 404 can be executed. In some embodiments, high level program 404 can be executed on e.g., task manager 310. For example, when the task manager determines that convolution computation for a first iteration is finished upon receiving barrier instructions from all cores, task manager 310 can select one of the cores (e.g., core 2024) and provide an "collect&reduce" instruction to the core to collect data (e.g., intermediate feature maps) from the other cores and to reduce them into one feature map, which can be used as an input for a next layer. For example, core 2024 can retrieve intermediate feature maps from the local memory of each core in association with task manager 310 and store the retrieves intermediate feature maps in local memory unit 306 of core 2024. Therefore, after intermediate feature maps have been retrieved from other cores, core 2024 can possess all intermediate feature maps for further processing.

Other than sending the "collect&reduce" instruction, after barrier instructions from all cores have been received, task manager 310 can send to all cores "resume" instructions to resume the convolution computation for a second iteration. As discussed above, each core can include a plurality of processing units and a reduction unit. Therefore, the collection and reduction for the first iteration and the convolution computer for the second iteration can be performed in parallel. This allows a synchronization scheme between the task manager and the cores, establishing a dependence relationship among all cores when cross-core data exchange is needed.

In some embodiments, a compiler can be responsible for generating and sending the "wait" instruction, the "collect&reduce" instruction, and the "resume" instruction to each core. It is appreciated that the "wait" instruction and the "collect&reduce" instruction can be compiled into hardware instructions.

Table 1 below further illustrate execution of program 400 on cores of FIG. 3. As discussed above, in core 2024, computing unit 302 can perform the convolution computation, and interface 304, local memory unit 306, and reduction unit 308 can perform the collection and the reduction. Therefore, in Table 1, the interface, the local memory unit, and the reduction unit can be collectively referred to as R&C units.

TABLE 1

| Core 2024 //Processing Unit | //R&C units | Core 2026 //Processing Unit | //R&C units | Core 2028 //Processing Unit | //R&C units | Core 2030 //Processing Unit | //R&C units |
|---|---|---|---|---|---|---|---|
| comp($K_i$); signal(i, 1); comp($K_{i+1}$); signal(i + 1, 1); | wait(i, 4); collect($R_i$, 1); reduce($R_i$) | comp($K_i$); signal(i, 1); comp($K_{i+1}$); signal(i + 1, 1); | | comp($K_i$); signal(i, 1); comp($K_{i+1}$); signal(i + 1, 1); | | comp($K_i$); signal(i, 1); comp($K_{i+1}$); signal(i + 1, 1); | |
| comp($K_{i+2}$); signal(i + 2, 1); | | comp($K_{i+2}$); signal(i + 2, 1); | wait(i + 1, 4); collect($R_{i+1}$, 1); reduce($R_{i+1}$); | comp($K_{i+2}$); signal(i + 2, 1); | | comp($K_{i+3}$); signal(i + 2, 1); | |
| comp($K_{i+3}$); signal(i + 3, 1); | | comp($K_{i+3}$); signal(i + 3, 1); | | comp($K_{i+3}$); signal(i + 3, 1); | wait(i + 2, 4); collect($R_{i+2}$, 1); reduce($R_{i+2}$); | comp($K_{i+3}$); signal(i + 3, 1); | |
| comp($K_{i+4}$); signal(i + 4, 1); | | comp($K_{i+4}$); signal(i + 4, 1); | | comp($K_{i+4}$); signal(i + 4, 1); | | comp($K_{i+4}$); signal(i + 4, 1); | wait(i + 3, 4); collect($R_{i+3}$, 1); reduce($R_{i+3}$); |

As shown in Table 1, in an $i^{th}$ iteration (i.e., the first row), each of the cores (e.g., core 2024, 2026, 2028, or 2030) performs convolution computation on a set of matrices to generate feature maps, and signals, e.g., a barrier instruction to a task manager (e.g., task manager 310 of FIG. 3). Results of the convolution computation can be stored locally in each core. After the task manager receives all barrier instructions from all four cores, the task manager can generate and send out a "resume" instruction and a "wait" instruction to the processing unit and the R&C units of each core, respectively. Upon receiving the "resume" instruction, the processing units can perform convolution computation of an $i+1^{th}$ iteration. Meanwhile, the R&C units of core 2024 can collect the feature maps from other cores and perform reduction on the collected feature maps. As shown in Table 1, the convolution computation of the $i+1^{th}$ iteration and the reduction on the feature maps of the $i^{th}$ iteration are performed in parallel.

Also, referring to Table 1, when a number of cores associated with a task manager is N and a number of a set of matrices to be processed is K, for a $k^{th}$ iteration, a $(k \% N)^{th}$ core among the cores can function as a reduction core, which retrieves external results associated with the set of matrices from other cores and generates the reduced matrix. k is a positive integer that is less than or equal to K. It is appreciated that, other cores can further transmit local results to the $(k \% N)^{th}$ core. "k % N" represents a remainder after k being divided by N. For example, as shown in Table 1, when N=4 and k=3, a $3^{rd}$ core (e.g., core 320) will retrieve external results and generate the reduced matrix.

In Table 1, among the cores, a first core (e.g., core 2024) generates a first reduced matrix, a second core (e.g., core 2026) generates a second reduced matrix, a third core (e.g., core 2028) generates a third reduced matrix, and a fourth core (e.g., core 2030) generates a fourth reduced matrix, and the first reduced matrix, the second reduced matrix, the third reduced matrix, and the fourth reduced matrix can be combined into a set of reduced matrices in an interleaved manner.

Figure 5:
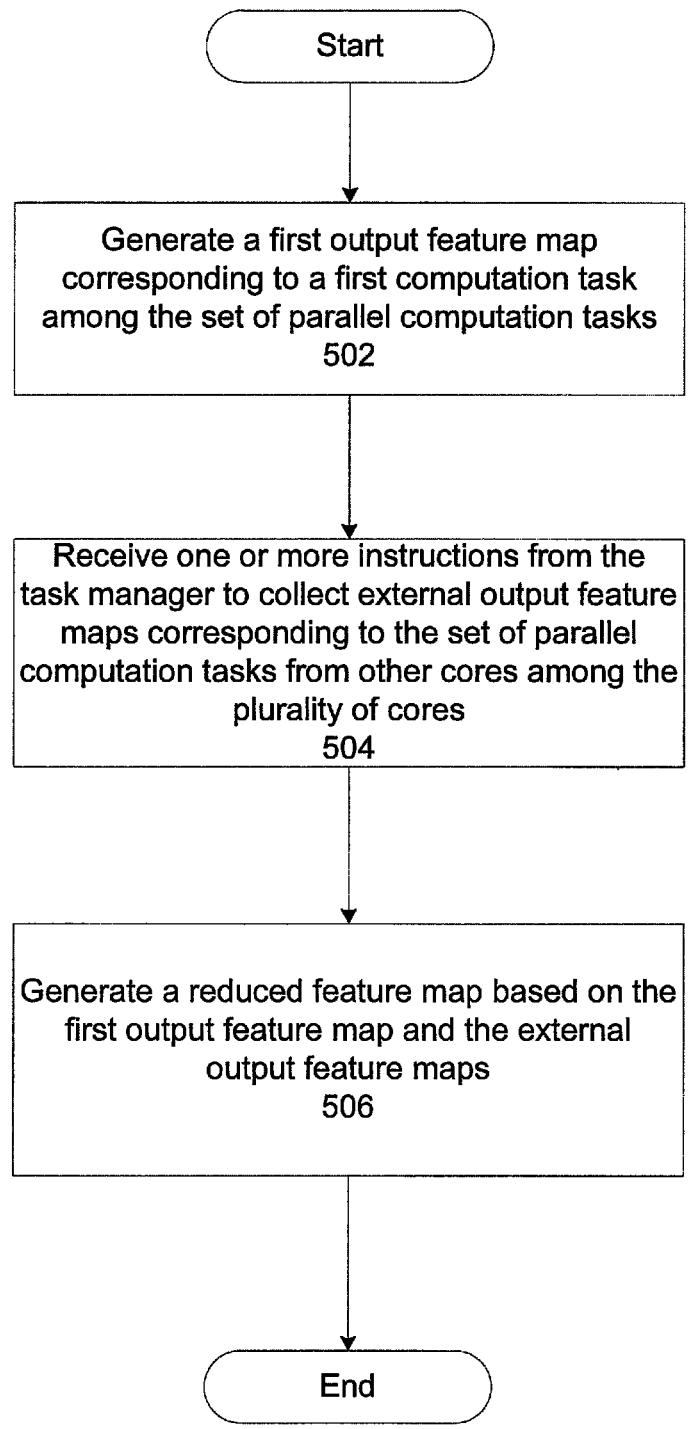
FIG. 5 illustrates a flowchart providing an exemplary method for performing a set of parallel computation tasks on a set of matrices by a plurality of cores coupled with a task manager, according to embodiments of the disclosure.

FIG. 5 illustrates a method 500 for performing a set of parallel computation tasks on a set of matrices by a plurality of cores coupled with a task manager, according to embodiments of the disclosure. Method 500 can be implemented by, for example, one of cores 2024, 2026, 2028, and 2030 of FIG. 3. Method 500 can include steps as below.

In step 502, a processing unit of the core can generate a first output feature map corresponding to a first computation task among the set of parallel computation tasks. The first output feature map can be generated by performing convolution processing on a first matrix of a set of matrices. The processing unit of the core can also generate a second output feature map corresponding to a second computation task. When the first output feature map is generated, the core can issue a barrier instruction to the task manager, and stall generation of the second output feature map. It is appreciated that each of the cores can issue its own barrier instruction to the task manager.

In step 504, an interface of the core can receive one or more instructions from the task manager to collect external output feature maps corresponding to the set of parallel computation tasks from other cores among the plurality of cores. It is appreciated that each of the plurality of cores can perform processing on a portion of the set of matrices and generate output feature maps.

In step 506, a reduction unit of the core can generate a reduced feature map based on the first output feature map and the external output feature maps. As discussed above, the reduced feature map can be used as input for a next iteration of the parallel computation tasks.

Among the plurality of cores, a first core can generate a first reduced output feature map, a second core can generate a second reduced output feature map, a third core can generate a third reduced output feature map, and a fourth core can generate a fourth reduced output feature map, and the first reduced output feature map, the second reduced output feature map, the third reduced output feature map, and the fourth reduced output feature map are combined into a set of reduced output feature maps in an interleaved manner.

In some embodiments, the task manager can determine whether the barrier instructions from each of the plurality of cores are received. In response to the determination that the barrier instructions from each of the plurality of cores are received, the task manager can then send a resume instruction to each of the plurality of core to resume the generation of the second output feature map.

Moreover, the task manager can also select a reduction core among the plurality of cores to receive the external output feature maps and generate the reduced feature map in parallel with the generation of the second output feature map. For example, a number of the cores can be N, a number of the set of matrices can be K, and for a $k^{th}$ iteration, the reduction core is a $(k \% N)^{th}$ core among the plurality of cores. It is appreciated that k is a positive integer that is less than or equal to K.

Figure 6:
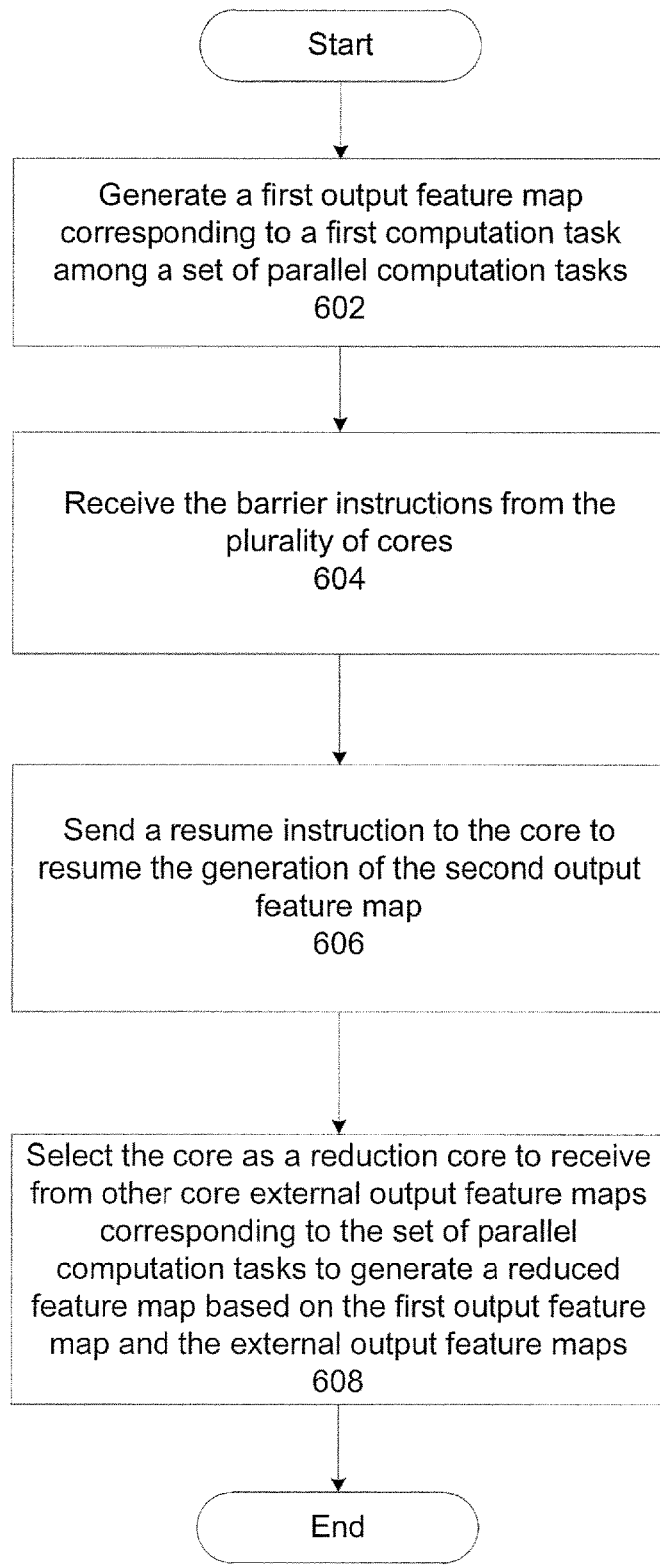
FIG. 6 illustrates a flowchart providing an exemplary method for managing tasks by a task manager coupled with a plurality of cores, according to embodiments of the disclosure.

FIG. 6 illustrates a method 600 for managing tasks by a task manager coupled with a plurality of cores, according to embodiments of the disclosure. Method 600 can be implemented by, for example, task manager 310 of FIG. 3. Method 600 can include steps as below.

In step 602, task manager 310 can instruct a core of the plurality of cores (e.g., core 2024) to generate a first output feature map corresponding to a first computation task among a set of parallel computation tasks. For example, the first output feature map can be generated by performing convolution processing on a matrix of data. As discussed above, when the first output feature map is generated on the core, the core can issue a barrier instruction to task manager 310 and can stalls generation of a second output feature map corresponding to a second computation task. In some embodiments, the processing can be stalled by task manager 310 based on the barrier instruction.

Therefore, in step 604, task manager 310 can receive the barrier instructions from other cores of the plurality of cores. It is appreciated that the barrier instructions sent by the core in step 602 is also received by task manager 310. The barrier instructions can function as a synchronization scheme.

In step 606, task manager 310 can send a resume instruction to the core to resume the generation of the second output feature map. After the barrier instructions from all of the plurality of cores are received, task manager 310 can determine that the first computation task has been finished on each of the plurality of cores and send the resume instruction to each core to resume the generation of the second output feature map.

In step 608, task manager 310 can select the core as a reduction core to receive from other cores external output feature maps corresponding to the set of parallel computation tasks to generate a reduced feature map based on the first output feature map and the external output feature maps. The generation of the second output feature map occurs in parallel with the generation of the reduced feature map. For example, after the barrier instructions from all of the plurality of cores are received, task manager 310 can issue instructions to the selected reduction core to collect the external output feature maps from cores other than the reduction core to generate the reduced feature map. As the generation of the second output feature map is also resumed in step 606, the generation of the second output feature map and the generation of the reduced feature map can occur in a different order or in parallel.

Embodiments of the disclosure also provide a computer program product. The computer program product may include a non-transitory computer readable storage medium having computer readable program instructions thereon for causing a processor to carry out the above-described methods.

The computer readable storage medium may be a tangible device that can store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

The computer readable program instructions for carrying out the above-described methods may be assembler instructions, instruction-set-architecture (ISA) instructions, machine instructions, machine dependent instructions, microcode, firmware instructions, state-setting data, or source code or object code written in any combination of one or more programming languages, including an object-oriented programming language, and conventional procedural programming languages. The computer readable program instructions may execute entirely on a computer system as a stand-alone software package, or partly on a first computer and partly on a second computer remote from the first computer. In the latter scenario, the second, remote computer may be connected to the first computer through any type of network, including a local area network (LAN) or a wide area network (WAN).

The computer readable program instructions may be provided to a processor of a computer, or other programmable data processing apparatus to produce a machine, such that the instructions, which execute via the processor of the computer or other programmable data processing apparatus, create means for implementing the above-described methods.

The flow charts and diagrams in the figures illustrate the architecture, functionality, and operation of possible implementations of devices, methods, and computer program products according to various embodiments of the specification. In this regard, a block in the flow charts or diagrams may represent a software program, segment, or portion of code, which comprises one or more executable instructions for implementing specific functions. It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the diagrams and/or flow charts, and combinations of blocks in the diagrams and flow charts, may be implemented by special purpose hardware-based systems that perform the specified functions or acts, or combinations of special purpose hardware and computer instructions.

It is appreciated that certain features of the specification, which are, for clarity, described in the context of separate embodiments, may also be provided in combination in a single embodiment. Conversely, various features of the specification, which are, for brevity, described in the context of a single embodiment, may also be provided separately or in any suitable subcombination or as suitable in any other described embodiment of the specification. Certain features described in the context of various embodiments are not to be considered essential features of those embodiments, unless the embodiment is inoperative without those elements.

Although the specification has been described in conjunction with specific embodiments thereof, it is evident that many alternatives, modifications and variations will be apparent to those skilled in the art. For example, although some embodiments are described using processing of a matrix of input data as an example, the described systems and methods can be applied to any parallel computation tasks. Accordingly, it is intended to embrace all such alternatives, modifications and variations that fall within the spirit and broad scope of the appended claims.

What is claimed is:

1. A system for performing parallel computation, comprising:
    a task manager; and
    a plurality of cores, coupled with the task manager, respectively perform a set of parallel computation tasks based on instructions from the task manager, wherein a respective core of the plurality of cores further comprises:
        a processing unit configured to generate a first output feature map corresponding to a first computation task among the set of parallel computation tasks;
        an interface configured to receive one or more instructions from the task manager to collect external output feature maps corresponding to the set of parallel computation tasks from other cores of the plurality of cores;
        a memory unit configured to store the first output feature map and the collected external output feature maps; and
        a reduction unit configured to generate a reduced feature map based on the first output feature map and the collected external output feature maps.

2. The system of claim 1, wherein the task manager is configured to instruct the respective core to simultaneously perform, by the processing unit, generation of a second output feature map corresponding to a second computation task and, by the reduction unit, the generation of the reduced feature map.

3. The system of claim 2, wherein when the first output feature map is generated, the processing unit is further configured to issue a barrier instruction to the task manager, and stalls the generation of the second output feature map.

4. The system of claim 3, wherein the task manager is further configured to receive barrier instructions from each of the plurality of cores.

5. The system of claim 4, wherein in response to a determination that the barrier instructions are received from each of the plurality of cores, the task manager is further configured to send a resume instruction to each of the plurality of cores to resume the generation of the second output feature map.

6. The system of claim 2, wherein the task manager is further configured to select a reduction core among the plurality of cores to receive the external output feature maps and generate the reduced feature map in parallel with the generation of the second output feature map.

7. The system of claim 6, wherein the first output feature map is generated by performing convolution processing on a first matrix of a set of matrices.

8. The system of claim 7, wherein a number of the plurality of cores is N, a number of the set of matrices is K, and for a $k^{th}$ iteration, the reduction core is a $(k \% N)^{th}$ core among the plurality of cores, wherein k is a positive integer that is less than or equal to K.

9. The system of claim 1, wherein, among the plurality of cores, a first core generates a first reduced output feature map, a second core generates a second reduced output feature map, a third core generates a third reduced output feature map, and a fourth core generates a fourth reduced output feature map, and the first reduced output feature map, the second reduced output feature map, the third reduced output feature map, and the fourth reduced output feature map are combined into a set of reduced output feature maps in an interleaved manner.

10. The system of claim 1, wherein the respective core comprises the memory unit including a first port for transceiving the first output feature map and the collected external output feature maps and a second port for cooperating with the processing unit to generate the reduced output feature map.

11. A method for performing a set of parallel computation tasks on a plurality of cores coupled with a task manager, comprising:
generating, by a processing unit of a core of the plurality of cores, a first output feature map corresponding to a first computation task among the set of parallel computation tasks;
receiving, by an interface of the core, one or more instructions from the task manager to collect external output feature maps corresponding to the set of parallel computation tasks from other cores of the plurality of cores;
storing, by a memory unit of the core, the first output feature map and the collected external output feature maps; and
generating, by a reduction unit of the core, a reduced feature map based on the first output feature map and the collected external output feature maps.

12. The method of claim 11, further comprising:
simultaneously performing, by the processing unit of the core, generation of a second output feature map corresponding to a second computation task and, by the reduction unit of the core, the generation of the reduced feature map.

13. The method of claim 12, further comprising:
in response to the first output feature map being generated, issuing a barrier instruction to the task manager, and
stalling the generation of the second output feature map.

14. The method of claim 13, wherein the task manager is further configured to determine whether barrier instructions from each of the plurality of cores are received.

15. The method of claim 14, wherein in response to a determination that the barrier instructions are received from each of the plurality of cores, the task manager is further configured to send a resume instruction to the core to resume the generation of the second output feature map.

16. The method of claim 12, wherein a reduction core among the plurality of cores is selected by the task manager to receive the external output feature maps and generate the reduced feature map in parallel with the generation of the second output feature map.

17. The method of claim 16, wherein the first output feature map is generated by performing convolution processing on a first matrix of a set of matrices.

18. The method of claim 17, wherein a number of the plurality of cores is N, a number of the set of matrices is K, and for a $k^{th}$ iteration, the reduction core is a $(k \% N)^{th}$ core among the plurality of cores, wherein k is a positive integer that is less than or equal to K.

19. The method of claim 11, wherein among the plurality of cores, a first core generates a first reduced output feature map, a second core generates a second reduced output feature map, a third core generates a third reduced output feature map, and a fourth core generates a fourth reduced output feature map, and the first reduced output feature map, the second reduced output feature map, the third reduced output feature map, and the fourth reduced output feature map are combined into a set of reduced output feature maps in an interleaved manner.

20. A method for managing tasks by a task manager coupled with a plurality of cores, comprising:
instructing a core of the plurality of cores to generate a first output feature map corresponding to a first computation task among a set of parallel computation tasks, wherein the core issues a barrier instruction to the task manager and stalls generation of a second output feature map corresponding to a second computation task, after the first output feature map is generated;
receiving, by the task manager, barrier instructions from other cores of the plurality of cores;
after the barrier instructions are received, sending a resume instruction from the task manager to the plurality of cores to resume the generation of the second output feature map; and
selecting the core to receive from other cores external output feature maps corresponding to the set of parallel computation tasks to generate a reduced feature map based on the first output feature map and the external output feature maps, wherein the selected core is configured to generate the second output feature map in parallel with the reduced feature map.

* * * * *